US011921990B2

(12) United States Patent
Seeley et al.

(10) Patent No.: US 11,921,990 B2
(45) Date of Patent: *Mar. 5, 2024

(54) MANAGING COMMENTS IN A CLOUD-BASED ENVIRONMENT

(71) Applicant: Google LLC, Mountain View, CA (US)

(72) Inventors: Damon Seeley, Sunnyvale, CA (US); Ariel Sachter-Zeltzer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,603

(22) Filed: Oct. 25, 2021

(65) Prior Publication Data

US 2022/0043549 A1 Feb. 10, 2022

Related U.S. Application Data

(63) Continuation of application No. 15/836,639, filed on Dec. 8, 2017, now Pat. No. 11,157,149.

(51) Int. Cl.
*G06F 3/0484* (2022.01)
*G06F 3/0482* (2013.01)
(Continued)

(52) U.S. Cl.
CPC .......... *G06F 3/0484* (2013.01); *G06F 3/0482* (2013.01); *G06F 16/178* (2019.01);
(Continued)

(58) Field of Classification Search
CPC .... G06F 16/178; G06F 3/0482; G06F 3/0484; G06F 40/166; G06F 40/169; G06F 2216/15; H04L 67/10
See application file for complete search history.

(56) References Cited

U.S. PATENT DOCUMENTS 5,283,856 A 2/1994 Gross et al.
9,529,785 B2 * 12/2016 Vagell .................. G06F 40/166
(Continued)

FOREIGN PATENT DOCUMENTS

EP 2972996 A2 1/2016
EP 3188052 A2 7/2017
(Continued)

OTHER PUBLICATIONS

International Search Report and Written Opinion on Application No. PCT/US2018/051232, dated Jun. 13, 2019.

*Primary Examiner* — Chau T Nguyen
(74) *Attorney, Agent, or Firm* — Lowenstein Sandler LLP

(57) ABSTRACT

A user interface comprising a set of comments that are aggregated from and included in a plurality of collaborative documents provided by a cloud-based content management platform are displayed. Each of the plurality of collaborative documents is a separate data file. A modification to a comment of the set of comments is received based on user input via the user interface displaying the set of comments included in the plurality of collaborative documents. Responsive to receiving the modification to the comment of the set of comments based on the user input via the user interface displaying the set of comments included in the plurality of collaborative documents, the user interface is updated to reflect the modified comment of the set of comments.

20 Claims, 10 Drawing Sheets

(51) Int. Cl.
*G06F 16/178* (2019.01)
*G06F 40/166* (2020.01)
*G06F 40/169* (2020.01)
*H04L 67/10* (2022.01)

(52) U.S. Cl.
CPC .......... *G06F 40/166* (2020.01); *G06F 40/169* (2020.01); *H04L 67/10* (2013.01)

(56) References Cited

U.S. PATENT DOCUMENTS

| | | |
|---|---|---|
| 9,753,921 B1 | 9/2017 | DeVincenzi et al. |
| 2002/0138582 A1 | 9/2002 | Chandra et al. |
| 2004/0003352 A1 | 1/2004 | Bargeron et al. |
| 2004/0249890 A1 | 12/2004 | Fellenstein et al. |
| 2005/0262051 A1 | 11/2005 | Dettinger et al. |
| 2007/0055926 A1 | 3/2007 | Christiansen |
| 2008/0215589 A1 | 9/2008 | Elhaik |
| 2011/0213805 A1 | 9/2011 | Walther et al. |
| 2012/0236201 A1 | 9/2012 | Larsen et al. |
| 2013/0014023 A1* | 1/2013 | Lee ...................... G06Q 10/101 715/751 |
| 2013/0198600 A1* | 8/2013 | Lockhart ............... G06F 16/116 715/230 |
| 2013/0246901 A1* | 9/2013 | Massand ............... G06F 40/197 715/229 |
| 2014/0081959 A1 | 3/2014 | Kass et al. |
| 2014/0082635 A1* | 3/2014 | Sitrick .................. G06F 40/103 719/318 |
| 2014/0280377 A1 | 9/2014 | Frew |
| 2014/0281875 A1 | 9/2014 | Branton et al. |
| 2014/0298207 A1 | 10/2014 | Ittah et al. |
| 2015/0082198 A1 | 3/2015 | Destagnol et al. |
| 2015/0142676 A1* | 5/2015 | McGinnis ............ G06Q 10/103 705/301 |
| 2018/0189255 A1* | 7/2018 | Kofman ................ G06F 40/169 |
| 2018/0219923 A1 | 8/2018 | Berger et al. |
| 2018/0253412 A1* | 9/2018 | Biswas ................. G06F 40/169 |
| 2019/0121875 A1* | 4/2019 | Niu ...................... H04L 65/403 |
| 2019/0121995 A1 | 4/2019 | Niu et al. |
| 2019/0124169 A1 | 4/2019 | Sundin et al. |
| 2019/0129973 A1* | 5/2019 | Truong ................. G06F 40/166 |

FOREIGN PATENT DOCUMENTS

| | | | | |
|---|---|---|---|---|
| GB | 2498047 A | * | 7/2013 | ............ G06F 15/16 |
| WO | WO-2012061297 A1 | * | 5/2012 | ........... G06F 16/176 |
| WO | 2014158815 A2 | | 10/2014 | |
| WO | 2017105971 A1 | | 6/2017 | |

* cited by examiner

MANAGING COMMENTS IN A CLOUD-BASED ENVIRONMENT

RELATED APPLICATION

This application is a continuation application of U.S. patent application Ser. No. 15/836,639, filed on Dec. 8, 2017, the entire contents of which are hereby incorporated by reference herein.

BACKGROUND

During development of an electronic document, it is often desirable to have multiple reviewers read, comment, and/or edit a draft of the electronic document. For example, an author may create an initial draft of an electronic document and share the electronic document with multiple editors who may concurrently edit (e.g., make changes and/or comments) the electronic document. The editors may create comments within the electronic documents. The comments may be visible within the particular electronic document to the editor who made the comment, other collaborators (e.g., users with whom the electronic document is shared), and/or the author of the electronic document.

SUMMARY

Aspects and implementations of the present disclosure manage comments in collaborative documents by providing a user interface in a cloud-based content management platform that displays a set of comments included in collaborative documents. The set of comments displayed may be selected based on whether the user is assigned the comment, whether the user is associated with the collaborative documents including the comments, whether the user created the comments, and so forth. Aggregating and displaying the set of comments included in collaborative documents in a single user interface may enhance processing speed and/or reduce memory usage because the user may not have to open separate collaborative applications to view the comments in the collaborative documents. The user may use the single user interface to respond to comments, resolve comments, reopen comments, assign comments, edit comments, accept suggestions included in comments, reject suggestions included in comments, etc. Various metrics may be determined and recorded for the set of comments and active alerts may be configured or set by default based on the metrics.

Further, the cloud-based management platform may enable the user to view a portion of a collaborative document including a selected comment in a first area of the user interface that also displays the aggregated set of comments in a second area with the user interface. This feature may further enhance processing speed and/or reduce memory usage by displaying the first area and the second area within the same user interface, instead of opening a new user interface to display the first area displaying the portion of the collaborative document including the selected comment.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
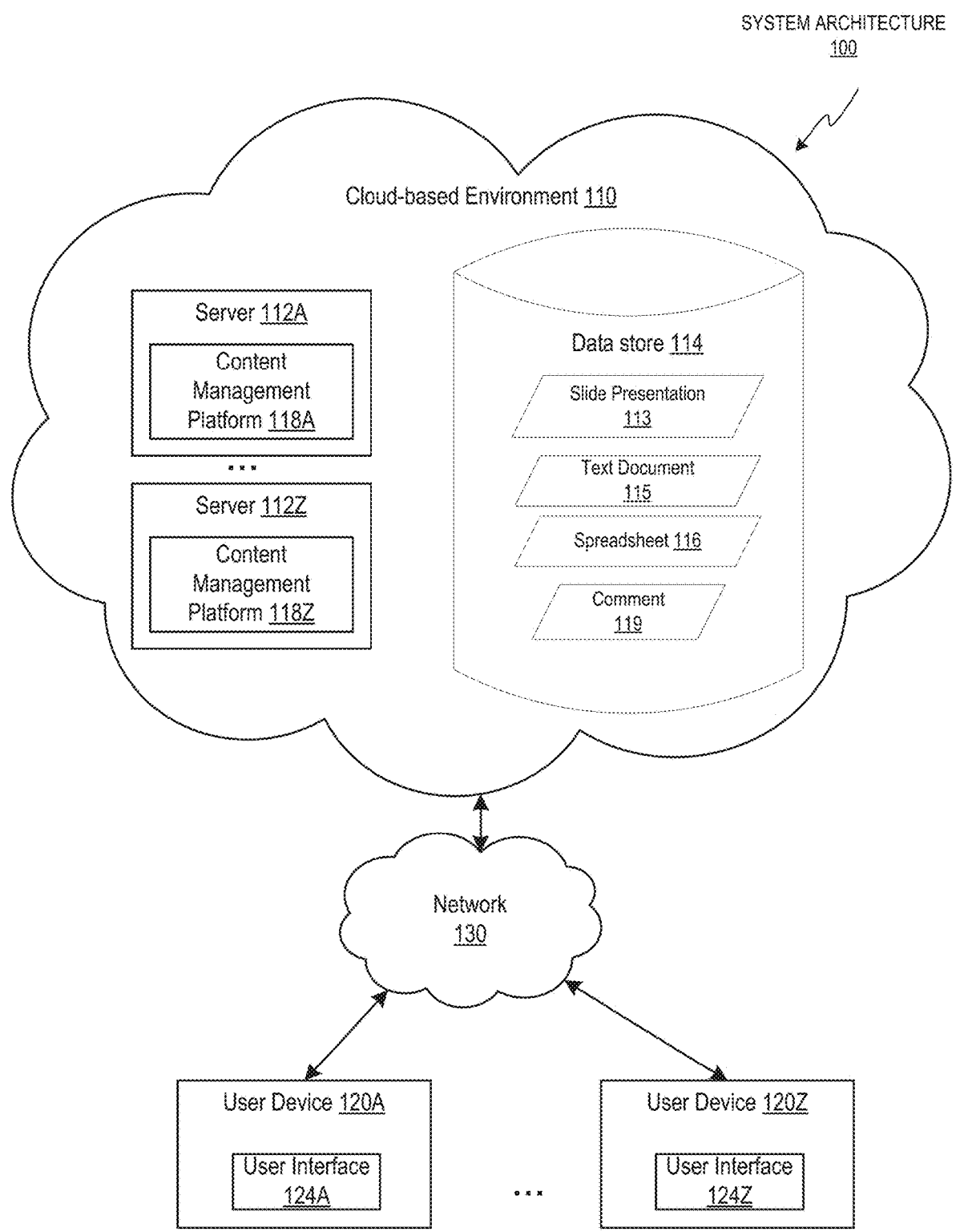
FIG. 1 illustrates an example of a system architecture for implementations of the present disclosure.

Cloud-based content management platforms may provide file storage and synchronization services, among other things. For example, a cloud-based content management platform may enable a user to store files on one or more servers in a cloud-based environment, synchronize the files across various devices of the user, and share the files with one or more other users. In some instances, the cloud-based content management platform may provide a single location to manage the files for the user. For example, the files may include electronic documents created using collaborative document applications (e.g., collaborative text processing application, collaborative spreadsheet application, collaborative slide presentation application).

An electronic document refers to media content used in electronic form. Media content may include text, tables, videos, audio, images, graphs, slides, charts, software programming code, designs, lists, plans, blueprints, maps, etc.

The cloud-based content management platform may enable an author of an electronic document to invite other users to join as collaborators with respect to the electronic document stored in the cloud-based platform. An electronic document to which users have been granted permission to access and/or edit concurrently may be referred to as a collaborative document herein.

The collaborative document may be provided to user devices of the collaborators via the cloud-based content management platform by one or more servers in the cloud-based environment. Each collaborator may be associated with a user type (e.g., editor, reviewer, viewer, etc.). Different views and capabilities may be provided to the collaborators based on their user type to enable editing (e.g., actually adding/changing text and/or suggesting changes), commenting on, reviewing, or simply viewing the collaborative document. Once granted permission to access the collaborative document, the collaborators may access the collaborative document to perform operations allowed for their user type. For example, numerous users with user types of reviewers may concurrently view and concurrently make comments on a collaborative text document. Additionally, users with user types of editors may suggest changes to a collaborative text document that cause comments to be created including the suggestions.

Conventionally, there may be numerous collaborative documents (e.g., artifacts) linked to one another within a same project and collaborators may be concurrently creating comments within the various collaborative documents. This approach is artifact-centric in that the comments that are created within the collaborative documents are accessible just in the collaborative document in which the comments are created. Collaborators that are assigned to the various comments or are associated with the project may attempt to manage the comments across the various collaborative documents. However, in large projects, there may be upwards of thirty to forty artifacts and the user may try to maintain open versions of those artifacts to manage any comments contained in the artifacts. As may be appreciated, keeping each of the artifacts open to manage any comments may be wasteful of computing resources (e.g., processing, memory). Further, there may be cognitive load on the user in searching for and opening the artifacts to respond to the comments. In some instances, these factors may cause some comments to get overlooked and remain unaddressed using the conventional technique for managing comments in collaborative documents.

Aspects and implementations of the present disclosure address at least these deficiencies, among others, by providing a cloud-based content management platform that manages and aggregates a set of comments included in collaborative documents and provides a user interface to present the aggregated set of comments in one place. Every comment that is associated with a certain user (e.g., a user logged into the cloud-based content management platform) may be displayed in a graphical element (e.g., list or table) of a user interface of the cloud-based content management platform. The set of comments displayed in the user interface may be included in the same or numerous different collaborative documents. The user interface may be updated when a modification is made to the set of comments in one or more of the collaborative documents. The modification to the set of comments that is made in the collaborative documents may include addition of new comments, deletion of existing comments, edits to existing comments, resolution of existing comments, replies to existing comments, assignment of existing comments, acceptance of suggestions, and/or rejection of suggestions.

Further, in some embodiments, the user may request to view a portion of a collaborative document including a particular comment to obtain a broader context for the particular comment. For example, the user interface may display the portion of the collaborative document including a paragraph of a collaborative text document with which the comment is associated so the user can better understand the context of the comment. The portion of the collaborative document and the associated comment may be displayed in a first area of the user interface of the cloud-based content management platform together with the aggregated comments being displayed in a second area of the user interface without actually opening the collaborative text document including the comment in a separate user interface (e.g., browser window). In some implementations, the portion of the collaborative document may not display the entire content of the collaborative document, but instead, just the content associated with the comment to provide context to the user.

In some instances, the user may modify a comment directly in the first area of the user interface displaying the portion of the collaborative document. Updating the comment in the collaborative document may cause the second area of the user interface displaying the aggregated set of comments to be updated with the modification. Also, since the comment was updated directly in the collaborative document, any user that is currently viewing the comment in the collaborative document may see the comment dynamically change based on the modification. Likewise, any user that is associated with the comment and that is viewing the set of comments in a user interface of the cloud-based content management platform may also see the comment dynamically change based on the modification.

Additionally, the cloud-based content management platform may provide, in the user interface, one or more options to perform actions including at least replying to the comments, assigning the comments to a specific user, resolving the comments, reopening the comments, accepting suggestions included in the comments, and/or rejecting suggestions included in the comments. The user interface of the cloud-based content management platform may display the comments in a graphical element (e.g., list or table) that includes one or more columns, such as a column representing text of the comments, file names of the collaborative documents including the comments, file types (e.g., collaborative text document, collaborative spreadsheet document, collaborative slide presentation document) of the collaborative documents including the comments, whether the comments include suggestion, owner names of the collaborative documents including the documents, names of the users that created the comments, timestamps of the comments, actions to perform related to the comments, and so forth.

The comments may be filtered in the graphical element based on a class type associated with the comments. For example, the class type may indicate whether the comments were made by a certain user, whether the comments are assigned to a certain user, whether the comments were made in a collaborative document owned by a certain user, and so forth.

Additionally, in some embodiments, various metrics associated with the comments may be determined and recorded. The metrics may include a total number of comments (e.g., per user, per collaborative document, per project, etc.), a response time to the comments, a timeframe when the comments were created, and so forth. In some embodiments, alerts may be configured or set by default based on the metrics. For example, one alert may be displayed in the user interface of the cloud-based content management system when the user does not respond to a comment within a threshold amount of time (e.g., a threshold amount of time from creation/assignment of the comment elapses without a response).

Some benefits of the comment-centric techniques of the present disclosure may provide a technical effect caused by and/or resulting from a technical solution to a technical problem. For example, one technical problem may relate to inefficient and/or over consumption of resources (e.g., processing, memory) by managing comments in different user interfaces for each of the various electronic documents. One of the technical solutions to the technical problem may include managing and aggregating a set of comments included in collaborative documents by providing a user interface to present the aggregated set of comments in one place. A technical effect that may result from and/or is caused by the technical solution to the technical problem may include enhancing processing speed and/or reducing memory consumption by displaying the aggregated comments included in collaborative documents in a single user interface without the user having to open separate user interfaces for each collaborative application to manage (e.g., view, edit, respond to, resolve, delete, accept suggestion, reject suggestion, etc.) the comments in the collaborative documents. Also, aggregating and displaying the comments in the single user interface may enable a user to manage the comments more effectively and efficiently. In addition, the alerts that may be triggered based on the metrics may enable a user to manage the comments better without overlooking any, thus reducing the number of "lost" comments (e.g., unaddressed comments).

FIG. 1 illustrates an example of a system architecture 100 for implementations of the present disclosure. The system architecture 100 includes a cloud-based environment 110 connected to user devices 120A-120Z via a network 130. A cloud-based environment 110 refers to a collection of physical machines that host applications providing one or more services (e.g., content management) to multiple user devices 120 via a network 130. The network 130 may be public networks (e.g., the Internet), private networks (e.g., a local area network (LAN) or wide area network (WAN)), or a combination thereof. Network 130 may include a wireless infrastructure, which may be provided by one or more wireless communications systems, such as a wireless fidelity (WiFi) hotspot connected with the network 130 and/or a wireless carrier system that can be implemented using various data processing equipment, communication towers, etc. Additionally or alternatively, network 130 may include a wired infrastructure (e.g., Ethernet).

The cloud-based environment 110 may include one or more servers 112A-112Z and a data store 114. The data store 114 may be separate from the servers 112A-112Z and communicatively coupled to the servers 112A-112Z or the data store 114 may be part of one or more of the servers 112A-112Z. In some embodiments, the data store 114 may be included as part of the user devices 120A-120Z. The data store 114 may store various collaborative documents, such as a collaborative slide presentation 113, a collaborative text document 115, a collaborative spreadsheet 116, or any suitable electronic document (e.g., an electronic document including text, tables, videos, images, graphs, slides, charts, software programming code, designs, lists, plans, blueprints, maps, etc.) that can be shared with users and/or concurrently editable by users. The term "concurrently editable" may refer to users concurrently modifying (e.g., adding, deleting, changing, etc.) content (e.g., text, cells, images, data, slides, etc.), concurrently suggesting changes to the content, concurrently making comments on the content, and the like. The data store 114 may also store one or more comments 119 created in the collaborative documents.

The collaborative documents may be created by an author and the author may share the collaborative documents with other users (e.g., collaborators). Sharing the collaborative documents may refer to granting permission to the other users to access the collaborative documents. Sharing the collaborative documents may include informing the other users of the collaborative documents via a message (e.g., email) including a link to the collaborative documents. The level of permissions that each user is granted may be based on the user type of each particular user. For example, a user with an editor user type may be able to open the collaborative documents and make changes directly to the collaborative documents. Further, an editor user type may be allowed to cause the collaborative application (e.g., collaborative text processing application) to enter a suggesting mode where any edits to the collaborative document made by the user cause the comment 119 to be created that includes the suggested changes, as shown in FIG. 4B. A user with a reviewer user type may just be allowed to create comments 119 in the collaborative documents.

When comments 119 are created in a collaborative document, the comments 119 may be associated with the user that created the comment 119 directly (e.g., via selecting an indicator representing adding a comment to the collaborative document) or indirectly (e.g., when a user is making changes in suggesting mode and a suggested change causes a comment to be created), and one or more other users. For example, a collaborative document may be created by an author and shared with another user that has a reviewer user type. The reviewer may open the collaborative document and create a comment 119 in the collaborative document. The comment 119 may be associated with the user ID of the reviewer and the user ID of the author. In some instances, the author may receive a notification that the comment 119 was created by the reviewer. Further, any other users that are collaborators on the collaborative document may receive notifications (if enabled) when comments 119 are created in the collaborative document. Additionally, in some instances, the creator of the comment 119 may assign the comment 119 to a particular user. Accordingly, when the user assigns the comment 119 to another user, the assignee user (e.g., the user to which the comment was assigned) may also become associated with the comment 119.

The created comment 119 may be stored in the data store 114 as part of the collaborative document in which the comment 119 was created or as its own data entry in a separate data structure in the data store 114. Various attributes may be associated with the comment 119 during storage, such as a user ID of the user creating the comment 119, an application ID of the collaborative application in which the comment 119 was created, an owner ID of the user that owns the collaborative document, body text of the comment 119 (can contain links), assignment flag that enables assigning tasks to other collaborators, other user IDs of users associated with the comment, a flag indicating whether the comment is resolved or not (this flag may toggle from resolved to not resolved if a user reopens a resolved comment), a file type of the collaborative document in which the comment 119 was created, a file name of the collaborative document in which the comment 119 was created, a timestamp when the comment 119 was created, a flag indicating whether the comment 119 includes or is associated with a suggestion, a project ID of the project with which the collaborative document including the comment 119 is associated, a team ID of the team with which the user that created the comment 119 is associated, and so forth.

The servers 112A-112Z may be physical machines (e.g., server machines, desktop computers, etc.) that each include one or more processing devices communicatively coupled to memory devices and input/output (I/O) devices. The servers 112A-112Z may host a content management platform (118A-118Z). The content management platform 118 may be implemented as computer instructions that are executable by one or more processing devices on each of the servers 112A-112Z. In alternative implementations, the content management platforms 118A-118Z may be installed on the user devices 120A-120Z (e.g., as a standalone application) and operate as peers in a peer-to-peer environment. In yet alternative implementations, applications on the user devices 120A-120Z may interact with the content management platform 118 and may perform some of the functionality of the content management platform 118.

One or more of the servers 112A-112Z may host the content management platform 118A-118Z. The server 112A-112Z selected to host the content management platform 118A-118Z may be based on certain load-balancing techniques, service level agreements, performance indicators, or the like. It should be understood that the servers 112A-112Z of the cloud-based environment 110 host the content management platforms 118A-118Z, and thus, the content manage platforms 118A-118Z may be referred to as cloud-based content management platforms 122A-122Z herein.

The cloud-based content management platform 118A-118Z may enable a user to view and/or manage collaborative documents, with which they are associated, within a respective user interface 124A-124Z. Additionally, in some embodiments, the cloud-based content management platform 118A-118Z may provide a user interface 124A-124Z that displays aggregated comments 119 included in the collaborative documents created by the user or associated with the user in the respective user interface 124A-124Z.

The cloud-based content management platform 118A-118Z may also enable users using different user devices 120A-120Z to simultaneously access the collaborative document (113, 115, or 116) to comment on, edit (e.g., modify or suggest changes), and/or view the collaborative document in a respective user interface 124A-124Z of the respective collaborative applications (e.g., collaborative slide presentation application, collaborative text processing application, collaborative spreadsheet application) that presents the collaborative document. In an implementation, the user interfaces 124A-124Z of the content management platform 118A-118Z may be web pages rendered by a web browser and displayed on the user device 120A-120Z in a web browser window. In another implementation, the user interfaces 124A-124Z may be displayed by a mobile application or a desktop application. For example, the user interfaces 124A-124Z may be displayed by a native application executing on the user device 120A-120Z. The native application may be separate from a web browser.

The user devices 120A-120Z may include one or more processing devices communicatively coupled to memory devices and I/O devices. The user devices 120A-120Z may be desktop computers, laptop computers, tablet computers, mobile phones (e.g., smartphones), or any suitable computing device. As discussed above, the user devices 120A-120Z may each include a web browser and/or a client application (e.g., a mobile application or a desktop application). A user that is invited and becomes a collaborator of the collaborative document may request to access the collaborative document via the web browser or the client application. For example, the user may select the collaborative document from the user interface 124A provided by the content management platform 118A and presented by the web browser or the client application. As such, the user device 120A associated with the user may request the collaborative document from the cloud-based environment 110.

The content management platform 118 may provide the requested collaborative document to the user device 120A. In some instances, a new user interface 124A-124Z for the collaborative application (e.g., collaborative text processing application) may be opened for presentation of the collaborative document (e.g., collaborative text document 115). Based on the user type of the user, the user may create a comment 119 or may suggest a change to the content that causes a comment 119 including the suggestion to be created. The comment 119 may be stored in the data store 114, and the cloud-based content management platform 118A may provide a set of comments 119 associated with the user in the user interface 124A, as described further below.

The content management platform 118A-118Z may receive a request for the set of comments from the user devices 120A-120Z. The set of comments may be created by and/or associated with the user logged into the content management platform 118A, for example. The content management platform 118A-118Z may retrieve the set of comments 119 included in the collaborative documents with which the user is associated from the data store 114. It should be understood that a user may be associated with a collaborative document and/or a comment if the user created the collaborative document and/or the comment, the collaborative document is shared with the user, the comment is assigned to the user, the user is associated with a project including the collaborative documents with comments, and so forth. The user interface 124A may be provided to the requesting user device 120A to display the aggregated set of comments.

In some embodiments, the content management platform 118A-118Z may record metrics related to the comments 119. For example, the content management platform 118A-118Z may determine a total number of comments 119 included in the collaborative documents per user, per project, per team, per type of collaborative document including the comments 119, and so forth. Content management platform 118A-118Z may also record metrics related to the timeframes (e.g., in the last day, last week, last month, last year, etc.) at which comments 119 are created. The content management platform 118A-118Z may also record metrics related to a response time to the comments 119.

In some embodiments, the metrics may cause one or more alerts to be triggered by the content management platform 118A-118Z. The alerts may be a visual indicator presented in the user interface 124A, a notification sent to the user (e.g., email, text message, etc.), audio emitted from the user device 120A, etc. For example, the content management platform 118A may cause the user interface 124A to provide an alert associated with a comment based at least on a threshold amount of time that has elapsed without the user responding to that comment. This type of active alert may prevent the user from overlooking a comment.

Figure 2A:
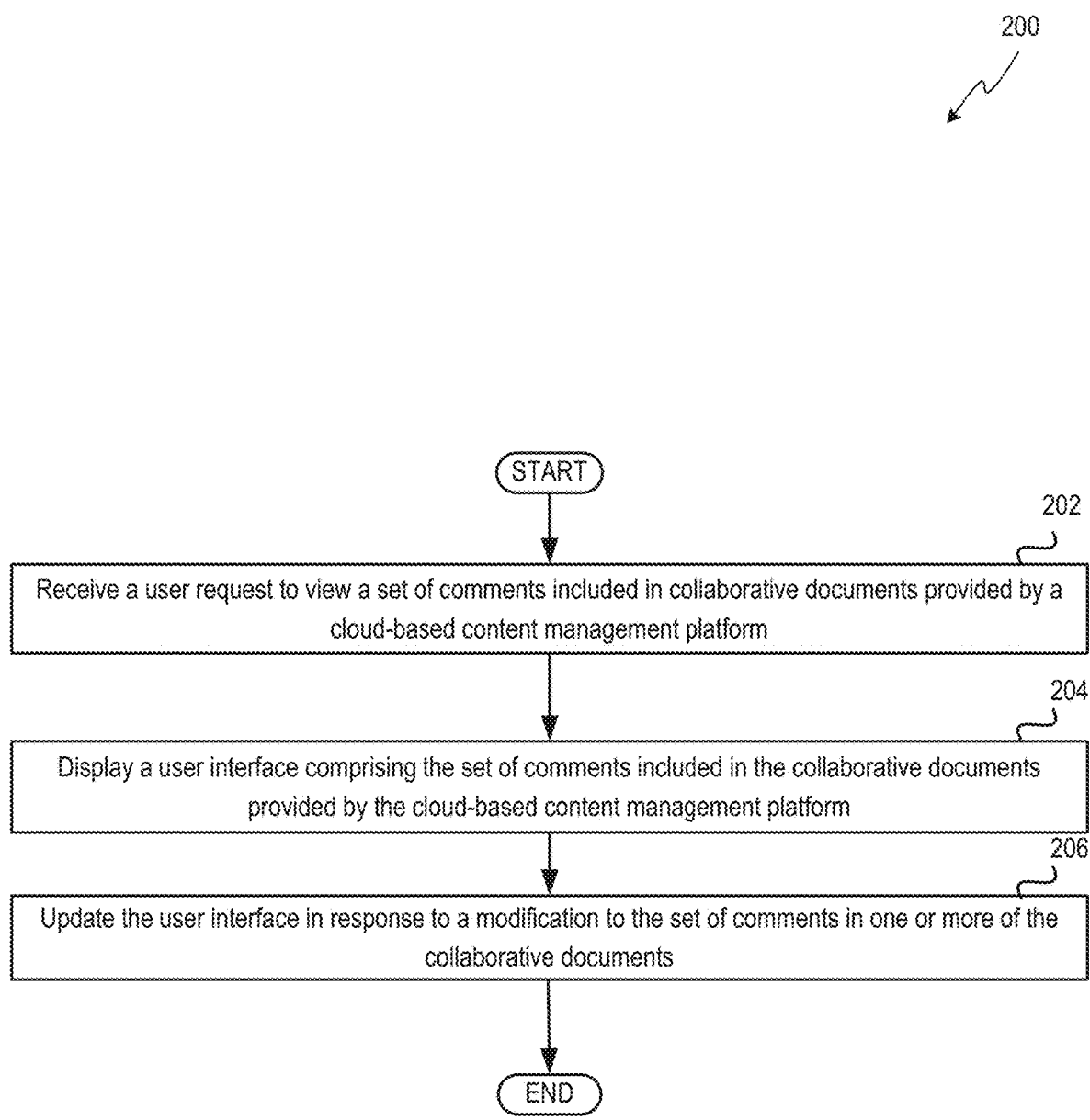
FIG. 2A depicts a flow diagram of aspects of a method for displaying a user interface including a set of comments included in collaborative documents, in accordance with one implementation of the disclosure.

FIG. 2A depicts a flow diagram of aspects of a method 200 for displaying a user interface including a set of comments 119 included in collaborative documents, in accordance with one implementation of the disclosure. Although the user interface 124A is used for discussion of method 200, it should be understood that any other user interface 124B-124Z may be used, instead of or in addition to the user interface 124A, to display the set of comments 119. Method 200 and each of its individual functions, routines, subroutines, or operations may be performed by one or more processing devices of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by a client application executed by one or more processing devices of the user devices 120A-120Z.

Figure 3:
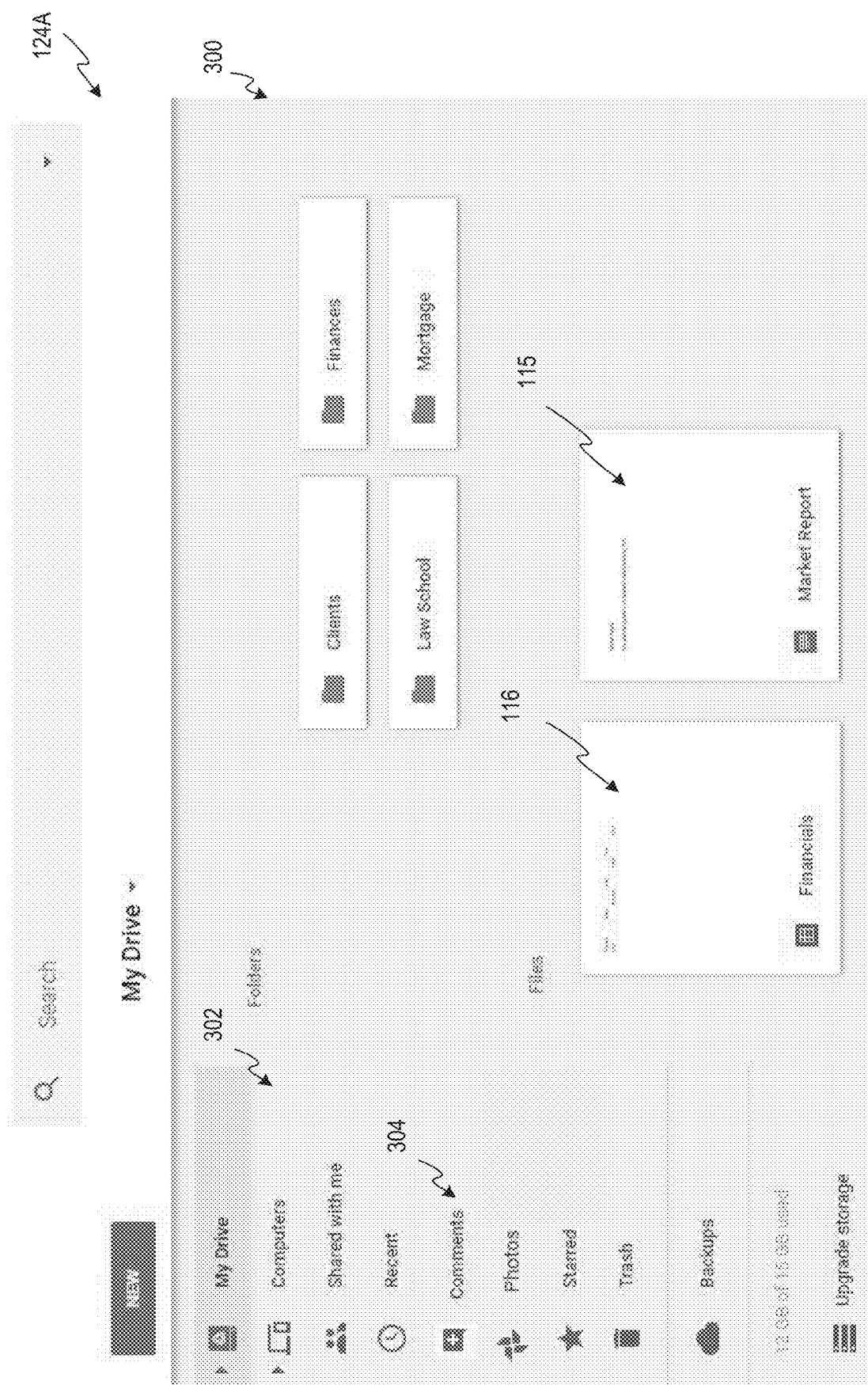
FIG. 3 illustrates an example user interface of the cloud-based content management platform providing collaborative documents, in accordance with one implementation of the disclosure.

At block 202, the processing device may receive a user request to view a set of comments 119 included in collaborative documents (e.g., collaborative slide presentation(s) 113, collaborative text document(s) 115, collaborative spreadsheet(s) 116) provided by the cloud-based content management platform 118A-118Z for display in the user interface 124A (example illustrated in FIG. 3). As previously discussed, a collaborator with certain permissions may be allowed to create comments 119 in the collaborative documents (example illustrated in FIG. 4A) and/or suggest changes to the collaborative documents that automatically causes a comment to be created that includes the suggestion (example illustrated in FIG. 4B). Once created, the comments may be stored in the data store 114 as part of the collaborative document in which they are created or may be stored separately by the cloud-based content management platform 118A-118Z.

The user request may cause a request for the set of comments 119 to be sent to the cloud-based content management platform 118A-118Z. The cloud-based content management platform 118A-118Z may receive the request and retrieve the set of comments 119 included in collaborative documents associated with the user logged into the content management platform 122A and/or that are assigned to the requesting user. The retrieved set of comments may include open and/or resolved comments 119. The retrieved set of comments 119 may be provided by the cloud-based content management platform 118A to the user device 120A for display in the user interface 124A. The user interface 124A including the retrieved set of comments may be generated by the cloud-based content management platform 118A and provided to the user device 120A for presentation by a web browser or a client application hosted by the user device 120A. Alternatively, the user interface 124A may be generated by the client application based on the retrieved set of comments (and other content) provided by the cloud-based content management platform 118A, and presented by the client application.

Figure 5:
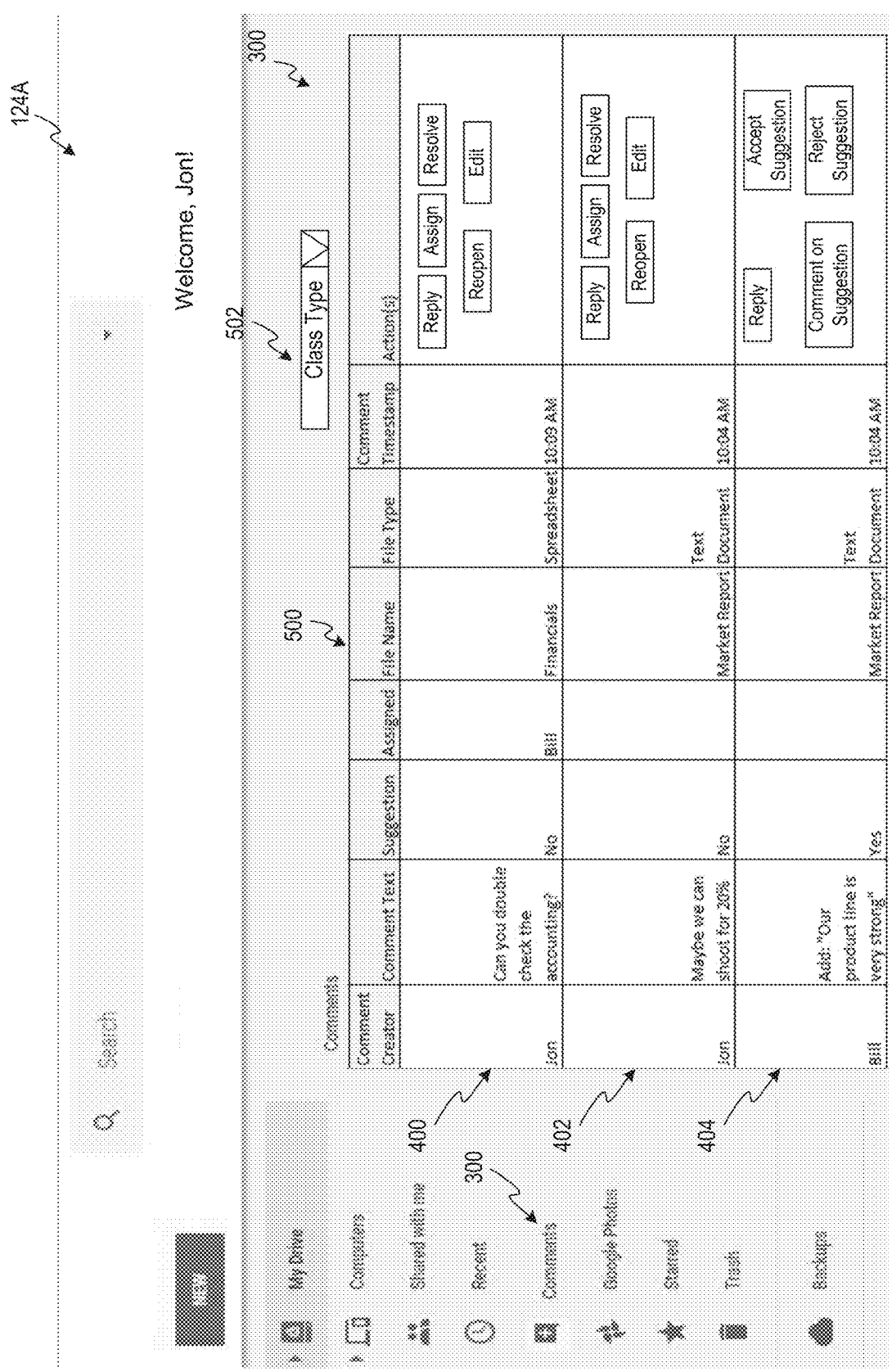
FIG. 5 illustrates an example user interface of the cloud-based content management platform displaying a set of comments included in collaborative documents, in accordance with one implementation of the disclosure.

The user device 120A may receive the set of comments 119. At block 204, the processing device may display the user interface 124A including the set of comments 119 included in the collaborative documents provided by the cloud-based content management platform 118A-118Z. An example user interface 124A including the set of comments 119 is illustrated in FIG. 5. The user interface 124A may display various details related to the set of comments 119, provide one or more filtering mechanisms, and provide one or more options to perform actions (e.g., reply, assign, edit, delete, resolve, accept suggestion, reject suggestion, etc.) related to the comments 119, as described further below with reference to FIG. 5.

Displaying the set of comments 119 in a single location (in the single user interface 124A) may enable a user to more efficiently and effectively manage the comments 119 by viewing and being able to take action on the comments 119 in a single location without having to open each of the collaborative documents in which the comments 119 are included. Further, displaying the set of comments 119 in the single location in the user interface 124A may improve performance and reduce memory usage because the user may not have to open each collaborative application in separate user interfaces to view the respective comments 119.

Figure 6A:
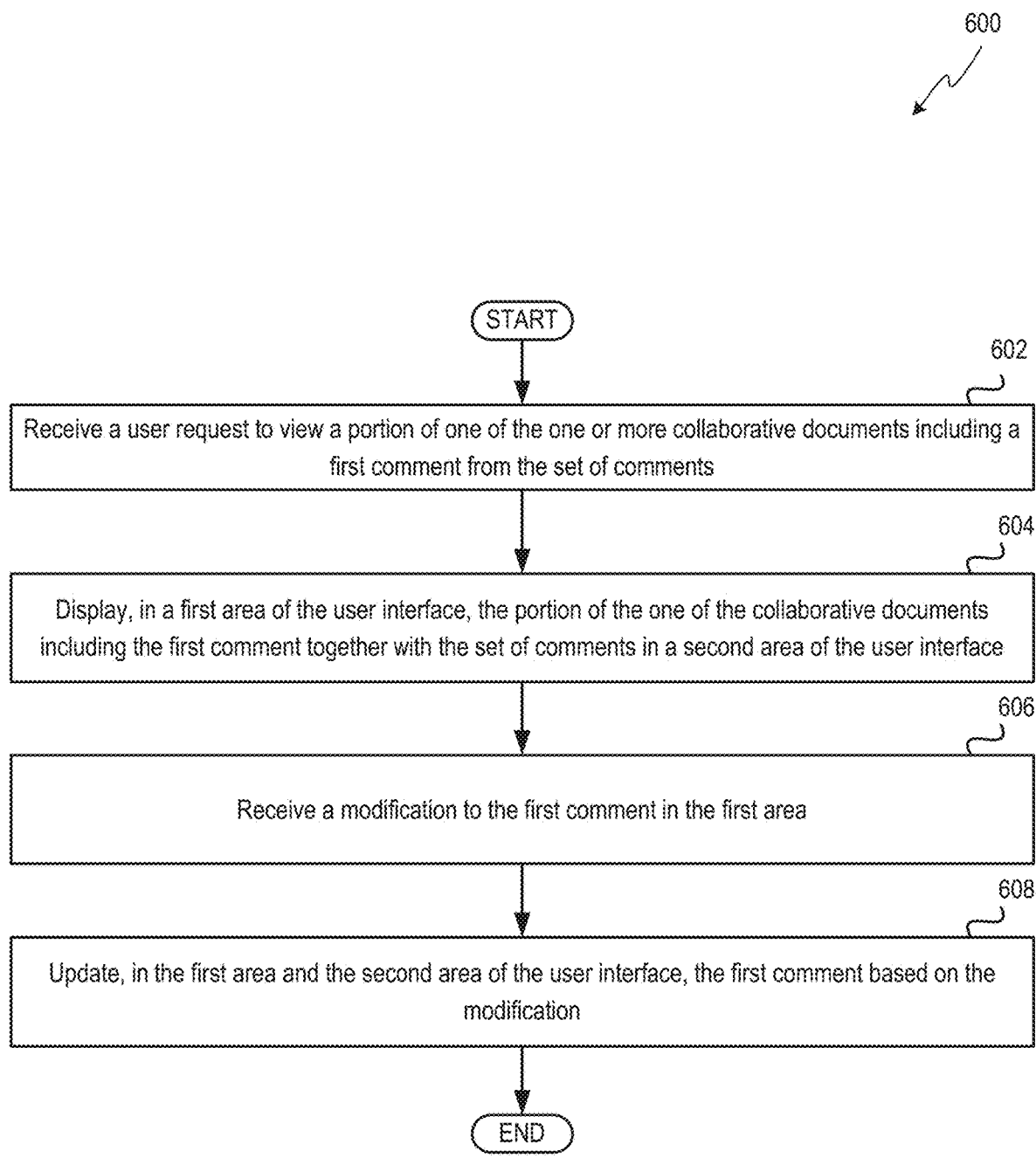
FIG. 6A depicts a flow diagram of aspects of a method for displaying a portion of a collaborative document including a selected comment in a first area of the user interface together with a set of comments in a second area of the user interface, in accordance with one implementation of the disclosure.
Figure 6B:
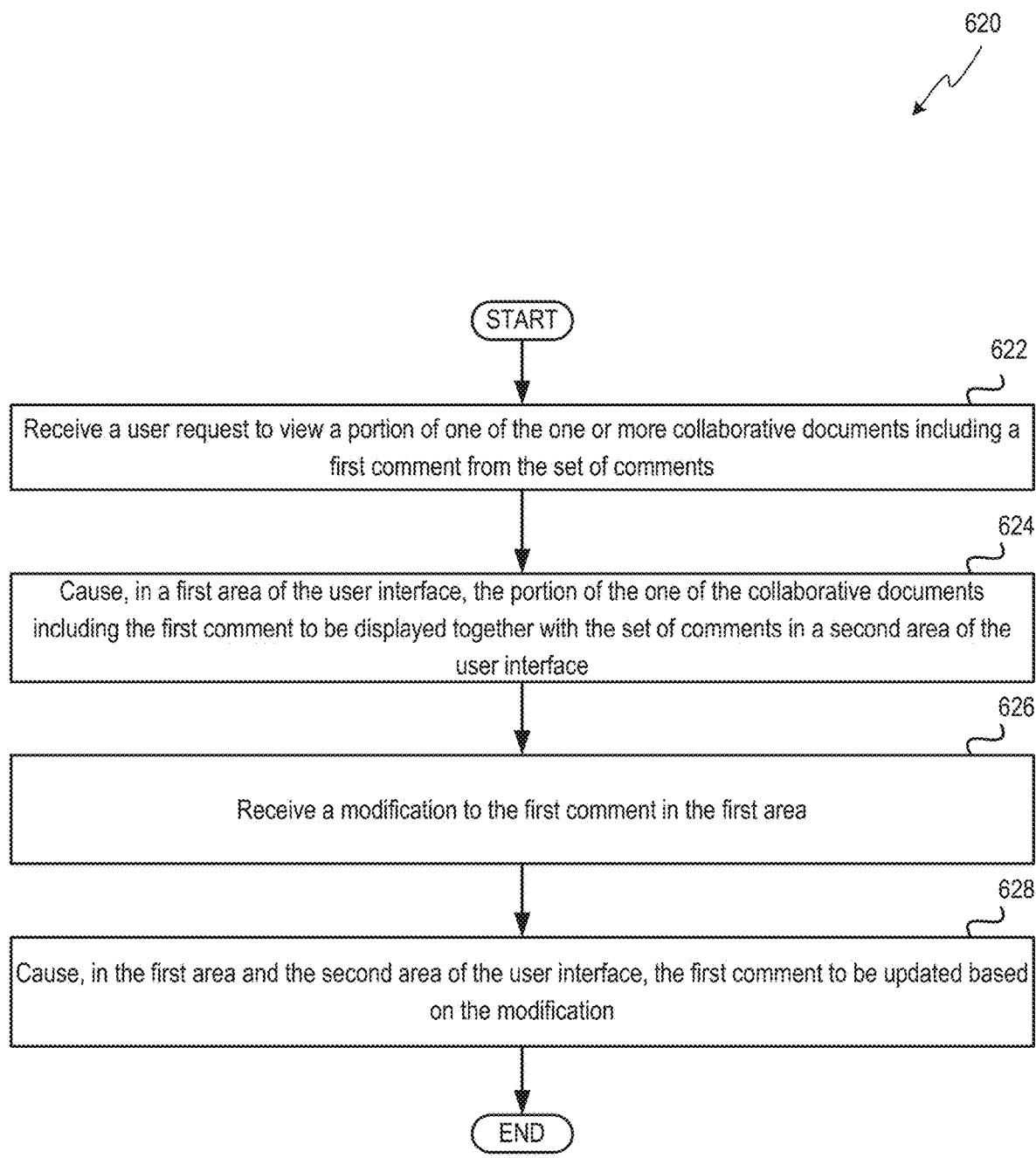
FIG. 6B depicts a flow diagram of aspects of a method for causing display of a portion of a collaborative document including a selected comment in a first area of a user interface together with a set of comments in a second area of the user interface, in accordance with one implementation of the disclosure.
Figure 7:
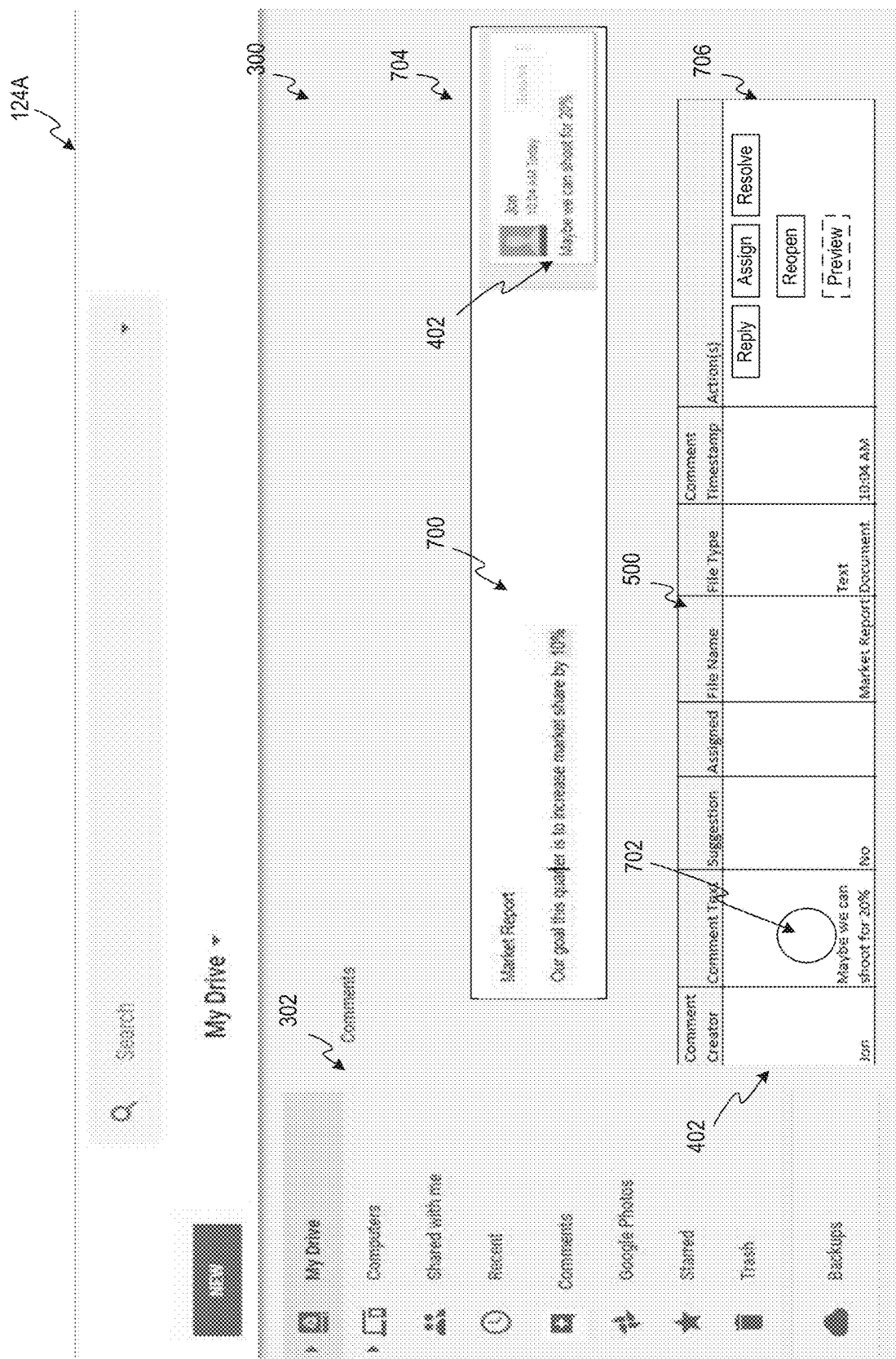
FIG. 7 illustrates an example user interface of the cloud-based content management platform displaying the portion of a collaborative document including a selected comment in a first area of the user interface together with the set of comments in a second area of the user interface, in accordance with one implementation of the disclosure.

Further, the user interface 124A may enable the user to view a portion of the collaborative document including a specific comment 119 to obtain a broader context for the comment 119. FIG. 6A depicts a method of displaying a portion of a collaborative document including a specific comment in the user interface 124A together with the set of comments 119. FIG. 6B depicts a method for causing display of the portion of the collaborative document including the specific comment in the user interface 124A together with the set of comments 119. FIG. 7 depicts an example of displaying the portion of the collaborative document including the specific comment in the user interface 124A together with the set of comments 119. In some embodiments, the user interface 124A may provide links for each of the various collaborative documents including the set of comments 119. Accordingly, a user may select one of the links, which may cause the collaborative application associated with the particular collaborative document represented by the link to be open in a new user interface 124A (e.g., a separate browser window, another view in an application, etc.)

At block 206, the processing device may update the user interface 124A in response to a modification to the set of comments 119 in one or more of the collaborative documents. The modification to the set of comments 119 may include at least one of adding a comment 119, deleting an existing comment 119, editing an existing comment 119, resolving an existing comment 119, replying to an existing comment 119, assigning an existing comment 119, reopening an existing comment 119, accepting a suggestion included in an existing comment 119, or rejecting a suggestion included in an existing comment 119.

It should be understood that, while the user interface 124A displays the set of comments 119 included in collaborative documents, one or more collaborators may be concurrently editing the collaborative documents. For example, a user with a user type of reviewer may access a collaborative document and may create a comment and assign it to a user viewing the set of comments in the user interface 124A of the cloud-based content management platform 118A. The user interface 124A may update in real-time or near real-time in response to the creation and assignment of the comment 119 to the user viewing the user interface 124A by displaying the newly created and assigned comment. Accordingly, the user interface 124A displaying the set of comments 119 may enable the user to easily manage multiple comments spread amongst multiple collaborative documents of a project.

To further enhance manageability of the comments 119, the processing device may provide one or more alerts associated with the set of comments 119 based on various metrics. In some embodiments, the cloud-based content management platform 118A-118Z may determine and record metrics related to a total number of the set of comments 119, a response time to the set of comments 119, or a timeframe when the set of comments 119 are made. Alerts may be configured or set by default to trigger based on the one or more metrics. For example, the processing device may provide an alert (e.g., visual indicator, audio, notification) associated with a particular comment 119 based at least on a threshold amount of time elapsing without a reply to the comment. If the user viewing the user interface 124A is the user that created the comment and assigned it to another user, then the alert may indicate that the other user has not replied within the threshold amount of time. If the user viewing the user interface 124A is the user to which the comment is assigned and the user has not replied within the threshold amount of time, then the alert may remind the user to reply and/or provide a prompt to reply to the comment 119.

Figure 2B:
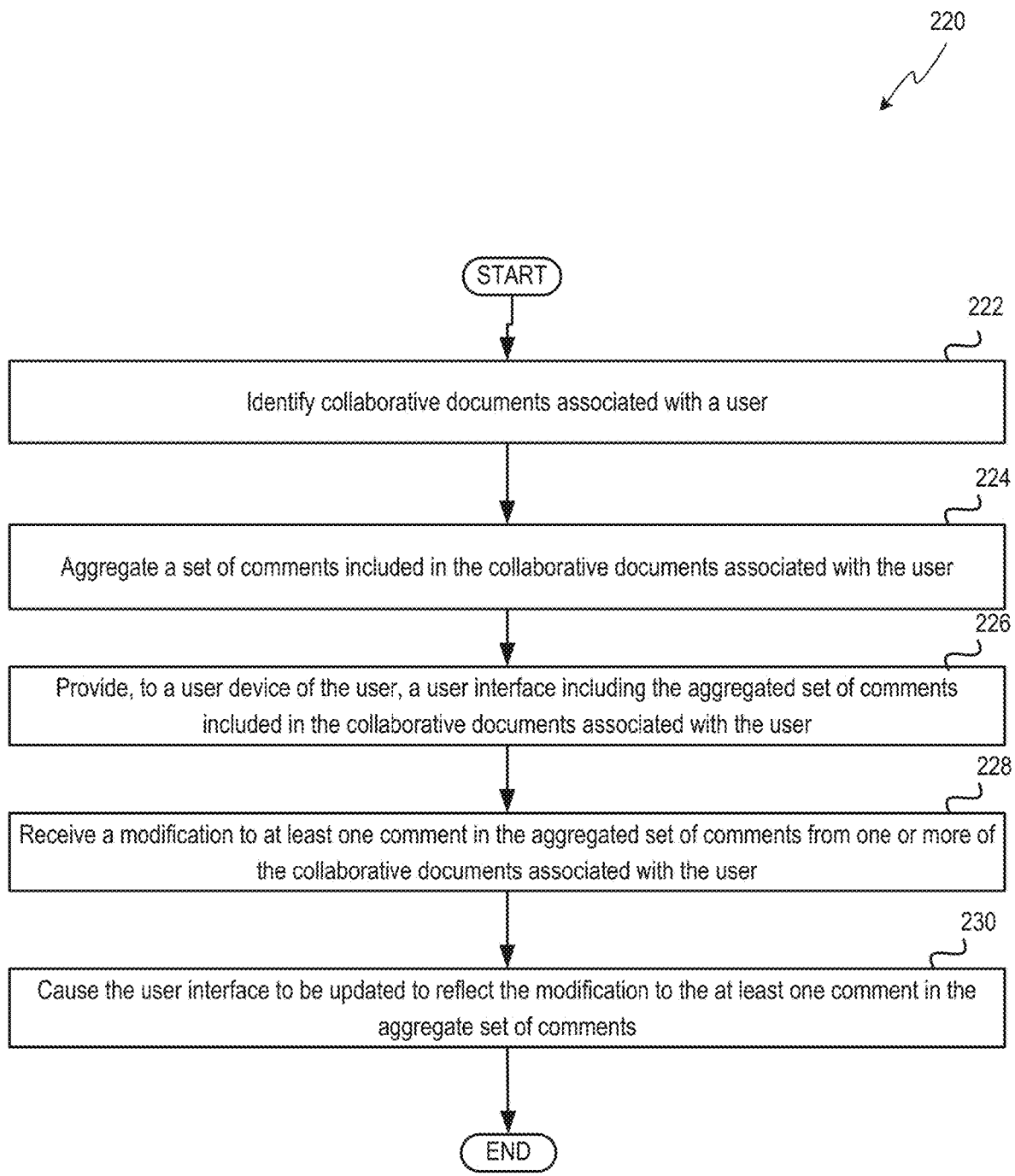
FIG. 2B depicts a flow diagram of aspects of a method for providing a user interface for display that includes a set of comments included in collaborative documents, in accordance with one implementation of the disclosure.

FIG. 2B depicts a flow diagram of aspects of a method 220 for providing a user interface for display that includes a set of comments included in collaborative documents, in accordance with one implementation of the disclosure. Although the user interface 124A is used for discussion of method 220, it should be understood that any other user interface 124B-124Z may be used, instead of or in addition to the user interface 124A, to display the set of comments and the portion of the collaborative document including a selected comment. Method 220 may be performed in the same or a similar manner as described above in regards to method 200. In one implementation, one or more of the operations described with reference to method 220 may be performed by content management platform 118A-118Z executed by one or more processing devices of the servers 112A-112Z.

At block 222, the processing device may identify collaborative documents associated with a user. The collaborative documents may be provided by a cloud-based content management platform 118A and may be stored in the data store 114. The user may be logged into the cloud-based content management platform 118A. As discussed above, a collaborative document may be associated with the user when the user creates the collaborative document, when the collaborative document is shared with the user, or the like.

At block 224, the processing device may aggregate a set of comments 119 included in the collaborative documents associated with the user. The comments 119 in the set of comments may be created by the user or by another user. The set of comments 119 may be aggregated from the data store 114 and/or extracted from the various collaborative documents associated with the user.

At block 226, the processing device may provide, to a user device 120A of the user, a user interface 124A including the aggregated set of comments 119 included in the collaborative documents associated with the user. The user interface 124A may include the columns described above. For example, the user interface 124A may provide options to perform actions (e.g., reply, assign, resolve, reopen, edit, accept suggestion included in the comment, reject suggestion included in the comment, etc.).

At block 228, the processing device may receive a modification to at least one comment 119 in the aggregated set of comments 119 from one or more of the collaborative documents associated with the user. The modification to the at least one comment 119 may be made by a second user accessing a collaborative document associated with the user displayed on a second user device 124B. In some embodiments, the modification to the at least one comment 119 may be made by a second user accessing a second user interface 124B displaying the aggregate set of comments in response to the second user selecting to perform an action to the at least one comment 119. The modification may include assigning the comment, reopening the comment 119, editing the comment 119, creating a new comment 119, resolving a comment 119, deleting a comment 119, accepting a suggestion included in the comment 119, rejecting a suggestion included in the comment 119, and so forth.

At block 230, the processing device may cause the user interface 124A to be updated to reflect the modification to the at least one comment 119 in the aggregate set of comments 119. In some implementations, the processing device may update the user interface 124A and provide the updated user interface 124A to the user device for display. Alternatively, the processing device may provide the modification to the at least one comment 119 (and other information necessary to update the user interface 124A such as the identification of the at least one comment 119) to the client application executing on the user device, and the client application then updates the user interface 124A accordingly. The user interface 124A may display the aggregated set of comments 119 included in the collaborative documents associated with the user in a single place and may enhance processing by avoiding opening each of the collaborative documents to manage the set of comments.

Further, in some embodiments, the processing device may record various metrics associated with each of the comments in the set of comments 119. For example, the processing device may record an elapsed amount of time since a comment 119 is created and determine when a threshold amount of time has elapsed without a reply to the comment 119. The processing device may cause one or more alerts to be displayed on the user interface 124A or played via the user device 120A based on the metrics (e.g., a reminder may be displayed to the user to reply to a comment 119 after a threshold amount of time elapses).

FIG. 3 illustrates an example user interface 124A of the cloud-based content management platform 118A providing collaborative documents, in accordance with one implementation of the disclosure. The user interface 124A may be displayed upon a user successfully logging into the cloud-based content management platform 118A. As depicted, the user interface 124A provides a main content area 300 in which various folders and files are displayed. The files may include any collaborative document associated with the user or any suitable file that is uploaded to the cloud-based content management platform 118A and stored in the data store 114. For example, a collaborative text document 115 and a collaborative spreadsheet 116 are provided in the main content area 300 of the user interface 124A for the cloud-based content management platform 118A. In some embodiments, the user logged into the cloud-based management platform 118A may have created the provided collaborative documents, the user may be a member of a team that has access to the collaborative documents, or the member may be assigned to a project that includes the collaborative documents.

The user interface 124A may also include a side toolbar 302. The toolbar 302 may include various menu options, such as an option to view files shared with the user, recent files added to the cloud-based comment management platform 118A, photos, starred files, and an option (e.g., link, button, etc.) 304 to display the set of comments 119. The option 304 may be displayed in any suitable location of the user interface 124A of the cloud-based content management platform 118A. The user request to view the comments 119 may be received by a user selecting the option 304 from the toolbar 302, for example. In response to the user request, the set of comments 119 may be displayed in the user interface 124A, as illustrated in FIG. 5.

Figure 4A:
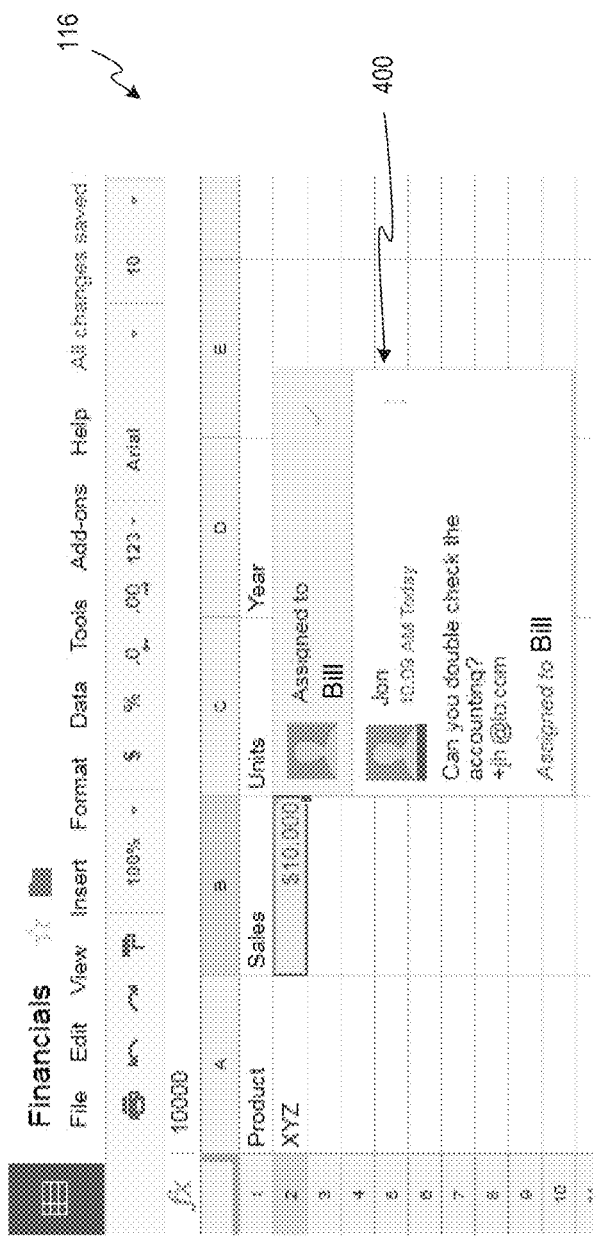
FIG. 4A illustrates an example collaborative spreadsheet including a comment assigned to a user, in accordance with one implementation of the disclosure.
Figure 4B:
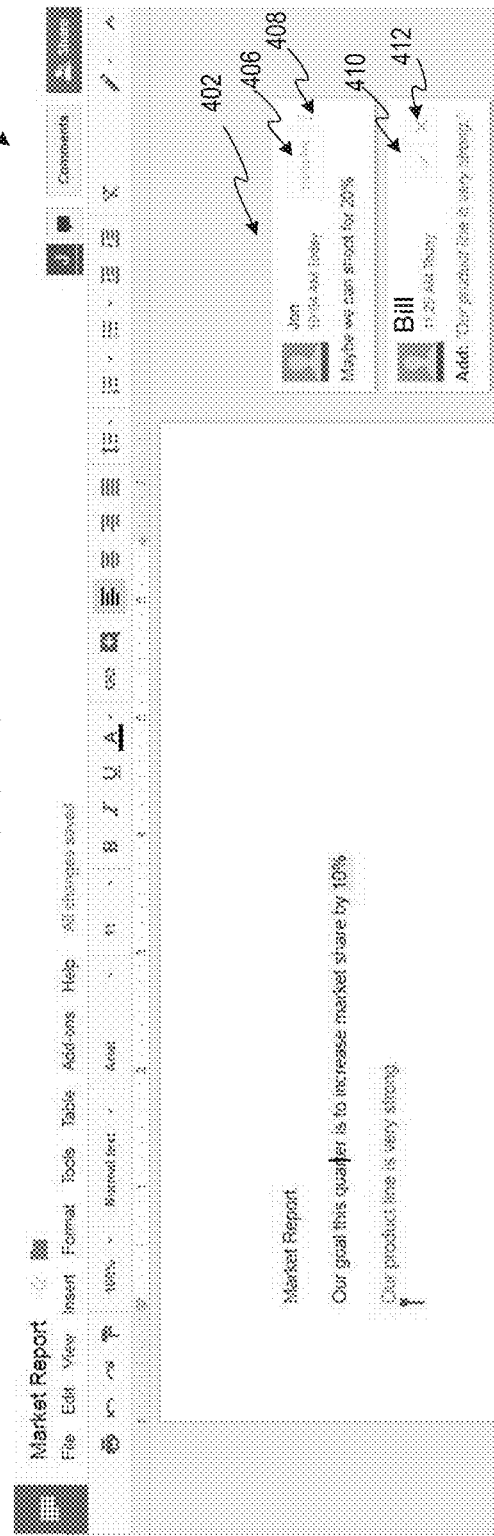
FIG. 4B illustrates an example collaborative text document including a first comment made by a first user and a second comment including a suggestion made by a second user, in accordance with one implementation of the disclosure.

FIGS. 4A and 4B illustrate examples of various ways comments 119 may be created in collaborative documents. It should be understood that the comments 119 may be made in the collaborative documents concurrently by multiple users and a user viewing the user interface 124A of the cloud-based content management platform 118A may view the set of comments 119 dynamically updating in real-time or near real-time while modifications are made to the set of comments 119. For purposes of explanation, it should be understood that a first user ("Jon") created the collaborative spreadsheet 116 and the collaborative text document 115 and shared them both with a second user ("Bill"). The second user may have been granted editor permissions and can thus make suggestions in suggesting mode.

FIG. 4A illustrates an example collaborative spreadsheet 116 including a comment 400 assigned to the second user ("Bill"), in accordance with one implementation of the disclosure. The collaborative spreadsheet 116 may be displayed in a user interface of a collaborative spreadsheet application launched from the user interface 124A of the cloud-based content management platform 118A. In the depicted example, the first user ("Jon") may be logged into the cloud-based content management platform 118A and viewing the user interface of the collaborative spreadsheet in user device 120A. The comment 400 may be created by the first user ("Jon") (e.g., at 10:09 AM). In particular, the first user selected the cell including value "$10,000," created the comment 400 that says "Can you double check the account?," and assigned the comment 400 to the second user "Bill." As such, the comment 400 may be associated with its creator ("Jon") and the user to whom the comment is assigned ("Bill"). The created comment 400 may be stored in the data store 114 in the cloud-based environment 110 by the cloud-based content management platform 118A.

FIG. 4B illustrates an example collaborative text document 115 including a first comment 402 made by the first user ("Jon") and a second comment 404 including a suggestion made by the second user ("Bill"), in accordance with one implementation of the disclosure. The collaborative spreadsheet 116 may be displayed in a user interface of a collaborative text processing application launched from the user interface 124A of the cloud-based content management platform 118A. In the depicted example, the first user ("Jon") may be logged into the cloud-based content management platform 118A and viewing the depicted collaborative text document 115 on user device 120A. The second user ("Bill") may also be logged into the cloud-based content management platform 122A and concurrently editing the collaborative text document 115 in suggesting mode on user device 120B.

For example, while in suggesting mode (e.g., available to editor user types), any changes made to the collaborative text document 115 cause a comment (e.g., comment 404) to automatically generate and include the suggested change. As depicted, "Bill" entered text "Our product line is very strong." The suggested text causes the comment 404 to automatically generate and include the suggestion ("Add: 'Our product line is very strong.'") made by Bill.

In addition, the first user ("Jon") may select a portion of the text ("10%") in the collaborative text document 115 and select an icon or option to create a comment. The first user may enter text "Maybe we can shoot for 20%" into the comment 402 to create the comment 402. The comments 402 and 404 may be stored in the data store 114. Both comments 402 and 404 included in the collaborative text document 115 may be visible to both users ("Jon" and "Bill") in the set of comments 119 in the user interface 124A of the cloud-based content management platform 118A because both users are associated with the collaborative text document 115 (e.g., "Jon" is the creator of the collaborative text document 115 and the collaborative text document 115 is shared with "Bill").

Further, as depicted, the comment 402 may include various options 406 and 408 to perform actions. Option 406 may include an action represented by a graphical element (e.g., button) for resolving the comment 402. Marking the comment 402 as resolved may cause the cloud-based content management platform 118A-118Z to set a resolved flag in the data store 114 for the particular comment 402. When a comment is resolved, it may no longer be visible on the user interface displaying the collaborative document. In some embodiments, resolved comments may be reopened by a user. Upon reopening, the comment may reappear at its previous location tied to its associated content in the user interface displaying the collaborative document. Options 408 may include an action represented by a graphical element (e.g., button) for deleting the comment 402. Deleting the comment 402 may delete the comment from the collaborative document and the data store 114 and deleted comments 402 may not be reopened.

The comment 404 may also include various options 410 and 412 to perform actions. Option 410 may include an action represented by a graphical element (e.g., button including a check mark) for accepting the suggestion made in the comment 404. If a user requests to perform the action (e.g., by selecting the button) and accept the suggestion, the accepted suggested change may be implemented in the collaborative text document 115 and the comment 404 may be removed from view in the user interface displaying the collaborative text document 115. Option 412 may include an action represented by a graphical element (e.g., button including an "X") for rejecting the suggestion made in the comment 404. If a user requests to perform the action (e.g., by selecting the button) and reject the suggestion, the rejected suggested change may not be implemented in the collaborative text document 115 (e.g., the change may be undone) and the comment 404 may be removed from view in the user interface displaying the collaborative text document 115.

FIG. 5 illustrates an example user interface 124A of the cloud-based content management platform 118A displaying a set of comments 400, 402, 404 included in collaborative documents, in accordance with one implementation of the disclosure. The set of comments 400, 402, 404 may be retrieved from the data store 114 by the cloud-based content management platform 118A-118Z and provided to the user device 120A in response to the user request (e.g., the user selecting the comments option 304). The set of comments retrieved for a user may include every comment the user has created, comments that other collaborators have created in collaborative documents associate with (e.g., created by, shared with) the user, other comments in which the user is engaged in a conversation. Engaging in a conversation within a comment may occur when the user replies to a comment. As depicted, the comments 400, 402, and 404 included in the collaborative spreadsheet 116 and the collaborative text document 115 illustrated in FIGS. 4A and 4B are received and displayed in the user interface 124A. Also, the first user ("Jon") is logged into the cloud-based content management platform 118A, as indicated by the greeting "Welcome, Jon!" displayed in the user interface 124A.

The set of comments 400, 402, and 404 may be displayed in a graphical element, such as table 500, in the main content area 300 of the user interface 124A. Any suitable graphical element may be used, such as a list. The table 500 may include at least one or more columns representing a name of the user that created the comment, text of the comment, whether the comment includes a suggestion, who the comment is assigned to, a file name of the collaborative document including the comment, a file type of the collaborative document including the comment, a timestamp for the comment, whether the comment is resolved, and so forth. It should be noted that the columns displayed in the table 500 are for illustrative purposes and not intended to limit the disclosure.

The comments may be ordered based upon values in any of the columns. For example, in the depicted table 500, the comments 400, 402, 404 are ordered based on the file name. However, in other embodiments, the data in the table 500 may be ordered chronologically by timestamp of the comment. In some embodiments, the representation of comments in the table 500 may be pivoted based on many possible different criteria (e.g., name of the user that create the comment, text of the comment, whether the comment includes a suggestion, who the comment is assigned to, the file name of the collaborative document including the comment, the file type of the collaborative document including the comment, the timestamp for the comment, whether the comment is resolved, etc.).

For comment 400, the columns include the following values: the comment creator is "Jon," the comment text is "Can you double check the accounting?," the comment 400 does not ("No") include a suggestion, the comment 400 is assigned to "Bill," the file name of the collaborative spreadsheet 116 is "Financials," the file type of the collaborative spreadsheet 116 is "Spreadsheet" (collaborative spreadsheet), the comment timestamp is "10:09 AM." For comment 402, the columns include the following values: the comment creator is "Jon," the comment text is "Maybe we can shoot for 20%," the comment 402 does not ("No") include a suggestion, the comment 402 is not assigned to any user, the file name of the collaborative text document 115 is "Market Report," the file type of the collaborative text document 115 is "Text Document" (collaborative text document), the comment timestamp is "10:04 AM." For comment 404, the columns include the following values: the comment creator is "Bill," the comment text is "Add: 'Our product line is very strong'," the comment 402 does ("Yes") include a suggestion, the comment 402 is not assigned to any user, the file name of the collaborative text document 115 is "Market Report," the file type of the collaborative text document 115 is "Text Document" (collaborative text document), the comment timestamp is "10:04 AM."

In some embodiments, the table 500 may also include a column for action(s) to be performed for the comments. Various graphical elements (e.g., buttons) representing the actions may be included in this column for each comment. For example, the actions may include at least one of replying to a comment, assign the comment to a specific user, resolving the comment, reopening the comment, editing a comment, accepting a suggestion associated with the comment, rejecting the suggestion, or commenting on the suggestion. In some embodiments, the graphical elements representing the actions for each of the comments may be separate from the table 500.

In some embodiments, every action may be displayed for each comment in the table 500. Also, in some embodiments, bulk actions may be performed using the table 500. For example, the user may select more than one comment that are included in one or more collaborative documents to apply the same action. In one instance, the user may select the resolve action for more than one comment and each of the comments associated with the resolve action may be resolved at the same time upon performance of the action. In another example, the user may select each comment that includes a suggestion and may accept the suggestions at the same time by performing a bulk action.

In some embodiments, the actions may be tailored in the table 500 based on whether the comment includes a suggestion. For example, comments 400 and 404 do not include suggestions and the actions that are provided include replying to the comment, assigning the comment, resolving the comment, reopening the comment, and editing the comment. Further, if the comment is resolved, then the resolve action may not be provided and just the reply, assign, reopen, and/or edit actions may be provided. If the comment is not resolved, then the reopen action may not be provided and just the reply, assign, resolve, and/or edit actions may be provided. Comment 404 does include a suggestion. Accordingly, the actions that may be provided include replying to the comment, accepting the suggestion included in the comment, rejecting the suggestion included in the comment, and commenting on the suggestion.

If the user performs one of the actions provided in the user interface 124A for a particular comment, that action may cause the set of comments to update and may cause the comment to be updated in its respective collaborative document. For example, if the user selects the assign action in the user interface 124A for comment 400 and assigns the comment 400 to another user "Ted", the comment 400 is updated in the collaborative spreadsheet 116 to reflect the assignment to "Ted". Additionally, a value under the assigned column for the comment 400 may be updated to "Ted." In another example, if the user selects the resolve action in the user interface 124A for comment, the resolve flag may be set in the data store 114 for the collaborative spreadsheet 116 and the comment 400 may be removed from view in the collaborative spreadsheet 116. Additionally, a value in a resolved column may be updated in the user interface 124A to indicate that the comment 400 is resolved. In another example, if the user accepts a suggestion included in the comment using the action in the user interface 124A, the suggested change may be implemented in the associated collaborative document and the comment including the suggestion in the collaborative document may be removed from being visible in the collaborative document. Further, if the user selects the edit action for a comment and changes the text of the comment in the table 500, the table may be updated to display the new text for the comment and the comment may be updated with the new text in the collaborative document in which the modified comment is included.

Additionally, the user interface 124A may include a filtering option 502. The filtering option 502 may be represented with any suitable graphical element (e.g., dropdown list, radio buttons, etc.). The filtering option 502 may enable a user to filter the set of comments by a class type associated with each of the set of comments. The class type may indicate whether each of the set of comments was made by a certain user, whether each of the set of comments is assigned to the certain user, or whether each of the set of comments was made in a collaborative document owned by the certain user. Additional filtering criteria may be represented in other filtering options. For example, another filtering option may enable a user to filter by project, by team, by collaborative document, etc.

In some embodiments, the table 500 may include links to open the collaborative documents including the comments. For example, the name of the collaborative document (e.g., "Financials") may be a link that, when selected, opens the collaborative spreadsheet in a collaborative spreadsheet application in another user interface. In some embodiments, the new user interface may be configured to bring a portion of the collaborative document including the associated comment into focus (e.g., by centering the document in the new user interface on the portion of the collaborative document including the associated comment).

FIG. 6A depicts a flow diagram of aspects of a method 600 for displaying a portion of a collaborative document including a selected comment in a first area of the user interface 124A together with a set of comments in a second area of the user interface 124A, in accordance with one implementation of the disclosure. Although the user interface 124A is used for discussion of method 600, it should be understood that any other user interface 124B-124Z may be used, instead of or in addition to the user interface 124A, to display the set of comments and the portion of the collaborative document including a selected comment. Method 600 may be performed in the same or a similar manner as described above in regards to method 200. In one implementation, method 600 may be performed by a client application executed by one or more processing devices of the user devices 120A-120Z.

FIG. 7 illustrates an example user interface 124A of the cloud-based content management platform 118A displaying a portion 700 of the collaborative text document 115 (illustrated in FIG. 4B) including a selected comment (illustrated by circle 702) in a first area 704 of the user interface 124A together with the set of comments 402 in a second area 706 of the user interface 124A, in accordance with one implementation of the disclosure. Although just the comment 402 is depicted in the second area 706, it should be understood that there may be numerous comments displayed in the second area 706. For purposes of clarity, FIG. 7 is discussed together with method 600 below.

At block 602, the processing device may receive a user request (e.g., selection 702) to view the portion 700 of one of the collaborative documents including a first comment (e.g., comment 402) from the set of comments displayed in the user interface 124A of the cloud-based content management platform 118A. The user request may include the user selecting the row including the comment or selecting the comment directly in the table 500. In some embodiments, the user request may include hovering over the desired comment with a cursor or holding down on the desired comment using a touchscreen, for example.

At block 604, the processing device may display, in the first area 704 of the user interface 124A, the portion 700 of the one of the collaborative documents including the first comment (e.g., comment 402) together with the set of comments in the second area 706 of the user interface 124A. The portion displayed may include a subset of the entire content of the collaborative document and may be tied to the comment 402 that is selected. As depicted, the portion 700 includes the text tied to the comment ("10%"), as well as the sentence above the text tied to the comment. However, the portion 700 does not include the entire content of the collaborative text document 115 (the portion 700 excludes "Our product line is very strong."). Further, the portion 700 also includes the actual comment 402 in the collaborative text document 115 displayed in the first area 704.

In some embodiments, although just a portion of the content of the collaborative document is shown in the first area 704, the first area 704 may provide controls (e.g., scrollbar) to view the entire content of the collaborative document if the user desires to view more of the collaborative document. Additionally, the first area 704 including the portion 700 may be displayed as an overlay (e.g., preview pane) to the other areas (e.g., the first area 706, an area including the side toolbar 302) of the user interface 124A. Additionally, when the first area 704 is displayed as an overlay on the user interface 124A in the foreground, the other areas in the background may have an effect (e.g., blurring, grayed out, etc.) applied to them such that the first area 704 is brought into focus.

Providing the portion 700 of the collaborative document tied to a particular comment 402 in the user interface 124A may provide context for the comment 402 to the user. Further, by displaying the portion in the first area 704 together with the set of comments displayed in the second area 706 in the same user interface 124A, processing speed and/or reduce memory usage may be enhanced by not opening the collaborative document in a separate user interface.

At block 606, the processing device may receive a modification to the first comment (comment 402) in the first area 704. As discussed above, depending on whether the comment includes a suggestion or not, the modification may include one or more of deleting the comment, editing the comment, resolving the comment, replying to the comment, assigning the comment, reopening the comment, accepting the suggestion included in the comment, or rejecting the suggestion in the existing comment. The modification may be saved for the comment 402 in the data store 114.

At block 608, the processing device may update, in the first area 704 and the second area 706 of the user interface 124A, the first comment 402 based on the modification. For example, if the user edited the text of the comment 402 in the first area 704, then, in some embodiments, the comment 402 may be updated in the first area 704 and in the table 500 in the second area 706 accordingly.

FIG. 6B depicts a flow diagram of aspects of a method for causing display of a portion of a collaborative document including a selected comment in a first area of a user interface together with a set of comments in a second area of the user interface, in accordance with one implementation of the disclosure. Although the user interface 124A is used for discussion of method 620, it should be understood that any other user interface 124B-124Z may be used, instead of or in addition to the user interface 124A, to display the set of comments and the portion of the collaborative document including a selected comment. Method 620 may be performed in the same or a similar manner as described above in regards to method 200. In one implementation, one or more of the operations described with reference to method 620 may be performed by content management platform 118A-118Z executed by one or more processing devices of the servers 112A-112Z. For purposes of clarity, FIG. 7 is discussed together with method 620 below.

At block 622, the processing device may receive a user request to view the portion 700 of one of the collaborative documents including a first comment (e.g., comment 402) from the set of comments displayed in the user interface 124A provided by the cloud-based content management platform 118A. The user request may include the user selecting the row including the comment or selecting the comment directly in the table 500 of the user interface 124A. In some embodiments, the user request may include hovering over the desired comment with a cursor or holding down on the desired comment using a touchscreen, for example. The user request may be received by the processing device from the user device 120A.

At block 624, the processing device may cause (e.g., by providing an updated user interface or providing information necessary for the client application to update the user interface), in the first area 704 of the user interface 124A, the portion 700 of the one of the collaborative documents including the first comment (e.g., comment 402) to be displayed together with the set of comments in the second area 706 of the user interface 124A. The portion displayed may include a subset of the entire content of the collaborative document and may be tied to the comment 402 that is selected. Further, the portion 700 may include the actual comment 402 in the collaborative text document 115 displayed in the first area 704. In some embodiments, although just a portion of the content of the collaborative document is shown in the first area 704, the first area 704 may provide controls (e.g., scrollbar) to view the entire content of the collaborative document if the user desires to view more of the collaborative document. Additionally, the processing device may cause the first area 704 including the portion 700 to be displayed as an overlay (e.g., preview pane) to the other areas (e.g., the first area 706, an area including the side toolbar 302) of the user interface 124A. Additionally, when the processing device causes the first area 704 to be displayed as an overlay on the user interface 124A in the foreground, the processing device may cause application of an effect (e.g., blurring, gray out, etc.) to the other areas in the background such that the first area 704 is brought into focus.

Providing the portion 700 of the collaborative document tied to a particular comment 402 in the user interface 124A may provide context for the comment 402 to the user. Further, by causing the portion in the first area 704 to be displayed together with the set of comments displayed in the second area 706 in the same user interface 124A, processing speed and/or reduced memory usage may be enhanced by not opening the collaborative document in a separate user interface.

At block 626, the processing device may receive a modification to the first comment (comment 402) in the first area 704. As discussed above, depending on whether the comment includes a suggestion or not, the modification may include one or more of deleting the comment, editing the comment, resolving the comment, replying to the comment, assigning the comment, reopening the comment, accepting the suggestion included in the comment, or rejecting the suggestion in the existing comment. The modification may be saved for the comment 402 in the data store 114.

At block 628, the processing device may cause (e.g., by providing an updated user interface or providing information necessary for the client application to update the user interface), in the first area 704 and the second area 706 of the user interface 124A, the first comment 402 to be updated based on the modification. For example, if the user edited the text of the comment 402 in the first area 704, then, in some embodiments, the processing device may cause the comment 402 to be updated in the first area 704 and in the table 500 in the second area 706 accordingly.

Figure 8:
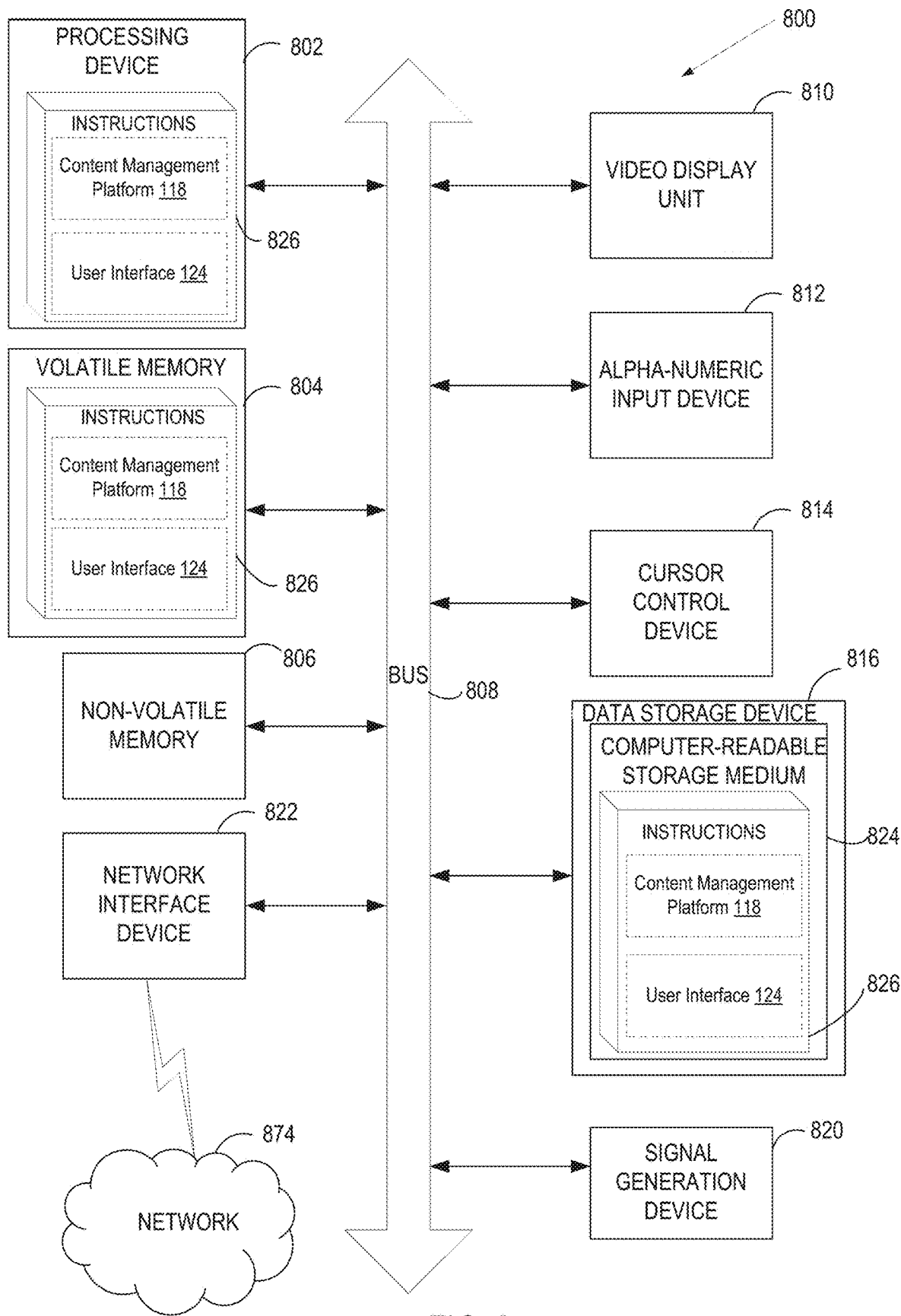
FIG. 8 depicts a block diagram of an example computing system operating in accordance with one or more aspects of the present disclosure.

FIG. 8 depicts a block diagram of an example computing system operating in accordance with one or more aspects of the present disclosure. In various illustrative examples, computer system 800 may correspond to any of the computing devices within system architecture 100 of FIG. 1. In one implementation, the computer system 800 may be each of the servers 112A-112Z. In another implementation, the computer system 800 may be each of the user devices 120A-120Z.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions implementing the cloud-based content management platform 118 (118A-118Z) and/or the user interface 124 (124A-124Z) of FIG. 1 for implementing the methods described herein.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "displaying", "moving", "adjusting", "replacing", "determining", "playing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

What is claimed is:

1. A method comprising:
   displaying, by a processing device, a user interface comprising a set of comments that are aggregated from and included in a plurality of collaborative documents provided by a cloud-based content management platform, wherein each of the plurality of collaborative documents is a separate data file;

receiving, based on a user input via the user interface displaying the set of comments, a modification to a comment of the set of comments that are displayed in the user interface and that are directed to specific content within respective collaborative documents of the plurality of collaborative documents; and responsive to receiving the modification to the comment of the set of comments based on the user input via the user interface displaying the set of comments included in the plurality of collaborative documents, (i) updating the user interface to display the modified comment along with the set of comments, and (ii) causing an update of information within a corresponding collaborative document of the plurality of collaborative documents to reflect the comment modified via the user interface.

2. The method of claim 1, further comprising:

receiving a user request to view the set of comments included in the plurality of collaborative documents provided by the cloud-based content management platform, wherein the cloud-based content management platform stores the plurality of collaborative documents and provides an instance of each of the plurality of collaborative documents for presentation at user devices associated with a plurality of user accounts, wherein each of the plurality of user accounts is associated with a user type that specifies access capabilities to a particular collaborative document of the plurality of collaborative documents.

3. The method of claim 1, wherein receiving, based on the user input via the user interface displaying the set of comments, the modification to the comment of the set of comments that are displayed in the user interface and that are directed to the specific content within the respective collaborative documents of the plurality of collaborative documents comprises:

receiving a user request to view a portion of one of the plurality of collaborative documents including the comment from the set of comments;

displaying, in a first area of the user interface, the portion of the one of the plurality of collaborative documents including the comment together with the set of comments in a second area of the user interface; and receiving the modification to the comment in the first area.

4. The method of claim 3, wherein updating the user interface to reflect the modified comment of the set of comments comprises:

updating, in the first area and the second area of the user interface, the comment based on the modification.

5. The method of claim 1, further comprising providing, in the user interface, one or more options to perform one or more actions comprising at least one of replying to the set of comments, assign the set of comments to a specific user, resolving the set of comments, reopening the set of comments, accepting a suggestion associated with one of the set of comments, rejecting the suggestion, or commenting on the suggestion.

6. The method of claim 1, further comprising filtering the set of comments by a class type associated with each of the set of comments, wherein the class type indicates whether each of the set of comments was made by a certain user, whether each of the set of comments is assigned to the certain user, or whether each of the set of comments was made in a collaborative document owned by the certain user.

7. The method of claim 1, wherein the modification to the set of comments comprises at least one of adding a comment, deleting an existing comment, editing the existing comment, resolving the existing comment, replying to the existing comment, assigning the existing comment, reopening the existing comment, accepting a suggestion included in the existing comment, or rejecting the suggestion included in the existing comment.

8. The method of claim 1, further comprising providing one or more alerts associated with the set of comments based at least on a threshold amount of time that has elapsed without a reply to the set of comments.

9. The method of claim 1, wherein one or more metrics are tracked for the set of comments, the one or more metrics comprise at least one of a total number of the set of comments, a response time to the set of comments, or a timeframe when the set of comments are made.

10. The method of claim 1, the cloud-based content management platform allows for concurrent user editing of each of the plurality of collaborative documents.

11. The method of claim 1, wherein the plurality of collaborative documents comprise at least one of a collaborative text document, a collaborative spreadsheet document, or a collaborative slideshow document.

12. The method of claim 1, wherein the user interface comprises a table including at least one or more columns representing text of the set of comments, a file name of the plurality of collaborative documents, a file type of the plurality of collaborative documents, or a name of a user that created the set of comments.

13. A method, comprising:

causing a display of a user interface at a user device associated with a user, the user interface comprising a set of comments that are aggregated from and included in a plurality of collaborative documents provided by a cloud-based content management platform, wherein each of the plurality of collaborative documents is a separate data file;

receiving, by a processing device, based on a user input via the user interface displaying the set of comments, an indication of a modification to a comment of the set of comments that are displayed in the user interface and that are directed to specific content within respective collaborative documents of the plurality of collaborative documents; and responsive to receiving the indication of the modification to the comment of the set of comments based on the user input via the user interface displaying the set of comments included in the plurality of collaborative documents, (i) causing an update of the user interface to display the modified comment along with the set of comments, and (ii) causing an update of information within a corresponding collaborative document of the plurality of collaborative documents to reflect the comment modified via the user interface.

14. The method of claim 13, further comprising:

receiving a user request to view the set of comments included in the plurality of collaborative documents provided by the cloud-based content management platform, wherein the cloud-based content management platform stores the plurality of collaborative documents and provides an instance of each of the plurality of collaborative documents for presentation at user devices associated with a plurality of user accounts, wherein each of the plurality of user accounts is associated with a user type that specifies access capabilities to a particular collaborative document of the plurality of collaborative documents.

15. The method of claim 13, wherein receiving, based on the user input via the user interface displaying the set of comments, the indication of the modification to the comment of the set of comments that are displayed in the user interface and that are directed to the specific content within the respective collaborative documents of the plurality of collaborative documents comprises:
receiving a user request to view a portion of one of the plurality of collaborative documents including the comment from the set of comments;
causing, in a first area of the user interface, a display of the portion of the one of the plurality of collaborative documents including the comment together with the set of comments in a second area of the user interface; and
receiving the indication of the modification to the comment in the first area.

16. A system, comprising:
a memory device storing instructions; and
a processing device coupled to the memory device, wherein the processing device executes the instructions to:
display a user interface comprising a set of comments that are aggregated from and included in a plurality of collaborative documents provided by a cloud-based content management platform, wherein each of the plurality of collaborative documents is a separate data file;
receive, based on a user input via the user interface displaying the set of comments, a modification to a comment of the set of comments that are displayed in the user interface and that are directed to specific content within respective collaborative documents of the plurality of collaborative documents; and
responsive to receiving the modification to the comment of the set of comments based on the user input via the user interface displaying the set of comments included in the plurality of collaborative documents, (i) update the user interface to display the modified comment along with the set of comments, and (ii) causing an update of information within a corresponding collaborative document of the plurality of collaborative documents to reflect the comment modified via the user interface.

17. The system of claim 16, the processing device further to:
receive a user request to view the set of comments included in the plurality of collaborative documents provided by the cloud-based content management platform, wherein the cloud-based content management platform stores the plurality of collaborative documents and provides an instance of each of the plurality of collaborative documents for presentation at user devices associated with a plurality of user accounts, wherein each of the plurality of user accounts is associated with a user type that specifies access capabilities to a particular collaborative document of the plurality of collaborative documents.

18. The system of claim 16, wherein to receive, based on the user input via the user interface displaying the set of comments, the modification to the comment of the set of comments that are displayed in the user interface and that are directed to the specific content within the respective collaborative documents of the plurality of collaborative documents, the processing device to:
receive a user request to view a portion of one of the plurality of collaborative documents including the comment from the set of comments;
display, in a first area of the user interface, the portion of the one of the plurality of collaborative documents including the comment together with the set of comments in a second area of the user interface; and
receive the modification to the comment in the first area.

19. The system of claim 18, wherein to update the user interface to reflect the modified comment of the set of comments, the processing device to:
update, in the first area and the second area of the user interface, the comment based on the modification.

20. The system of claim 16, the processing device further to:
provide, in the user interface, one or more options to perform one or more actions comprising at least one of replying to the set of comments, assign the set of comments to a specific user, resolving the set of comments, reopening the set of comments, accepting a suggestion associated with one of the set of comments, rejecting the suggestion, or commenting on the suggestion.

* * * * *